(12) United States Patent  
Allen

(10) Patent No.: US 10,203,003 B1  
(45) Date of Patent: Feb. 12, 2019

(54) BEARING ASSEMBLY

(71) Applicant: GM GLOBAL TECHNOLOGY OPERATIONS LLC, Detroit, MI (US)

(72) Inventor: Todd E. Allen, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/653,710

(22) Filed: Jul. 19, 2017

(51) Int. Cl.
| F16C 35/04 | (2006.01) |
| F16C 33/30 | (2006.01) |
| B62D 1/16 | (2006.01) |
| F16C 33/26 | (2006.01) |

(52) U.S. Cl.
CPC ............ F16C 35/042 (2013.01); B62D 1/163 (2013.01); F16C 33/26 (2013.01); F16C 33/30 (2013.01); *Y10T 29/49643* (2015.01); *Y10T 29/49647* (2015.01)

(58) Field of Classification Search
CPC ........ F16C 33/26; F16C 33/30; F16C 35/042; B62D 1/163; Y10T 29/49646; Y10T 29/49647; Y10T 29/49684
USPC ........ 74/485, 492, 493; 29/896.93, 898.063; 200/276; 343/895; 384/29, 37, 42, 95, 384/215, 276, 282, 566, 569
See application file for complete search history.

(56) References Cited

U.S. PATENT DOCUMENTS

| 1,200,060 | A | * | 10/1916 | Wemp | F16C 33/1065 |
| | | | | | 384/292 |
| 1,454,682 | A | * | 5/1923 | Layne | F16C 33/26 |
| | | | | | 277/516 |
| 1,563,663 | A | * | 12/1925 | Seabury | F16C 33/24 |
| | | | | | 384/297 |
| 2,251,714 | A | * | 8/1941 | Onions | B62K 19/34 |
| | | | | | 29/896.93 |
| 2,399,847 | A | * | 5/1946 | Bauersfeld | F16C 33/61 |
| | | | | | 29/898.063 |
| 3,167,366 | A | * | 1/1965 | Freund | F16C 33/20 |
| | | | | | 384/283 |
| 3,300,749 | A | * | 1/1967 | Lombardi | F16C 41/002 |
| | | | | | 200/11 R |
| 3,675,980 | A | * | 7/1972 | Stiff et al. | F16C 33/16 |
| | | | | | 384/298 |

(Continued)

FOREIGN PATENT DOCUMENTS

| DE | 3244258 A | * | 5/1984 | ............ F16C 35/077 |
| GB | 1035023 A | * | 7/1966 | ............ B61B 12/02 |

(Continued)

*Primary Examiner* — Marcus Charles  
(74) *Attorney, Agent, or Firm* — Cantor Colburn LLP

(57) ABSTRACT

A bearing assembly comprises an inner ring having an inner circumferential surface, and an outer circumferential surface defining an inner bearing race thereon, an outer ring having an outer circumferential surface, and an inner circumferential surface defining in outer bearing race thereon. The inner bearing race of the inner ring and the outer bearing race of the outer ring are located in a radially spaced apart relationship. A bearing member comprising a rod, having one of a circular cross-section and an ovular cross-section, is formed as a wound helix and is disposed between, and in line contact with, the inner bearing race and the outer bearing race to support relative rotation of the inner ring and the outer ring.

12 Claims, 4 Drawing Sheets

(56) References Cited

U.S. PATENT DOCUMENTS

| | | | | | |
|---|---|---|---|---|---|
| 3,680,930 | A | * | 8/1972 | Campbell | F16C 11/0614 384/211 |
| 3,918,772 | A | * | 11/1975 | Van Damme | F16C 33/26 384/282 |
| 4,569,601 | A | * | 2/1986 | Ippolito | E21B 10/22 384/291 |
| 4,728,088 | A | * | 3/1988 | Smith | F16C 33/26 251/902 |
| 5,964,426 | A | * | 10/1999 | Tabellini | E06B 9/60 160/316 |
| 6,168,314 | B1 | * | 1/2001 | Imai | F16C 23/02 384/215 |
| 8,368,304 | B2 | * | 2/2013 | Baacke | H01J 9/247 313/332 |
| 9,618,044 | B2 | * | 4/2017 | Schafers | F16C 33/60 |

FOREIGN PATENT DOCUMENTS

| | | | | | |
|---|---|---|---|---|---|
| GB | 1279425 | A | * | 6/1972 | B62D 1/192 |
| GB | 2158165 | A | * | 11/1985 | F16C 25/083 |
| JP | 02114078 | A | * | 4/1990 | B62K 21/00 |

* cited by examiner

BEARING ASSEMBLY

INTRODUCTION

The subject disclosure relates to bearing assemblies for supporting rotatable shafts and, more particularly, to a steering column assembly supported with a bearing assembly having a spiral bearing member.

A steering column assembly for an automobile or other steerable vehicle may include a rotatable steering shaft that is supported by one or more steering column bearing assemblies. A typical steering column bearing assembly includes an inner race, an outer race and ball bearings disposed therebetween to allow relative rotation of the races. In another example, the bearing assembly may comprise a solid ring seal that must be press-fit onto the rotatable steering shaft and is prone to friction and noise. Such bearing assemblies, while effective, are costly and may not prevent the ingress of moisture and contaminants both in and through the assembly and/or may generate undesirable noise from the steering column assembly.

Accordingly, it is desirable to have a steering column assembly supported by an improved and less costly bearing assembly.

SUMMARY

In one exemplary embodiment a bearing assembly comprises an inner ring having an inner circumferential surface and an outer circumferential surface defining an inner bearing race thereon and, an outer ring having an outer circumferential surface and an inner circumferential surface defining in outer bearing race thereon. The inner bearing race of the inner ring and the outer bearing race of the outer ring are located in a radially spaced apart relationship. A bearing member comprising a rod, having one of a circular cross-section and an ovular cross-section, is formed as a wound helix and is disposed between, and in line contact with, the inner bearing race and the outer bearing race to support relative rotation of the inner ring and the outer ring.

In addition to one or more of the features described above or below, or in the alternative, further embodiments may include the bearing assembly wherein the inner circumferential surface of the inner ring is disposed on a rotatable shaft and is fixed against rotation thereabout.

In addition to one or more of the features described above or below, or in the alternative, further embodiments may include the bearing assembly wherein the outer circumferential surface of the outer ring is fixedly disposed relative to a non-rotatable member.

In addition to one or more of the features described above or below, or in the alternative, further embodiments may include the bearing assembly wherein the helix has a helix angle α that approaches 0 degrees.

In addition to one or more of the features described above or below, or in the alternative, further embodiments may include the bearing assembly wherein the rod has rounded ends.

In addition to one or more of the features described above or below, or in the alternative, further embodiments may include the bearing assembly wherein the outer bearing race comprises a bearing stop.

In another exemplary embodiment a steering column assembly has a rotatable steering shaft extending through a vehicle bulkhead and is supported by a bearing assembly. The bearing assembly comprises an inner ring disposed, on the rotatable steering shaft and having an inner circumferential surface and an outer circumferential surface defining an inner bearing race thereon and an outer ring having an outer circumferential surface fixedly disposed relative to the vehicle bulkhead and an inner circumferential surface defining an outer bearing race thereon. The inner bearing race of the inner ring and the outer bearing race of the outer ring are located in a radially spaced apart relationship. A bearing member comprising a rod, having one of a circular cross-section and an ovular cross-section, is formed as a wound helix and is disposed between, and in line contact with, the inner bearing race and the outer bearing race to support rotation of the rotatable steering shaft relative to the vehicle bulkhead.

In addition to one or more of the features described above or below, or in the alternative, further embodiments may include the steering column assembly wherein the helix has a helix angle α that approaches 0 degrees.

In addition to one or more of the features described above or below, or in the alternative, further embodiments may include the steering column assembly wherein the rod has rounded ends.

In addition to one or more of the features described above or below, or in the alternative, further embodiments may include the steering column assembly wherein the outer bearing race comprises a bearing stop.

In addition to one or more of the features described above or below, or in the alternative, further embodiments may include the steering column assembly wherein the bearing member has a pre-assembled internal diameter "D" that is the equal to, or smaller than, the diameter "$D_R$" of the inner bearing race.

In addition to one or more of the features described above or below, or in the alternative, further embodiments may include a method of installing the bearing member onto the bearing race including placing the bearing member into the outer bearing race of the outer ring; expanding the bearing helix in a direction contrary to a direction of winding to increase the bearing inner diameter "D"; and axially sliding the outer bearing race containing the expanded diameter bearing member over the outer circumference of the inner ring until the bearing member is located in the inner bearing race of the inner ring.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
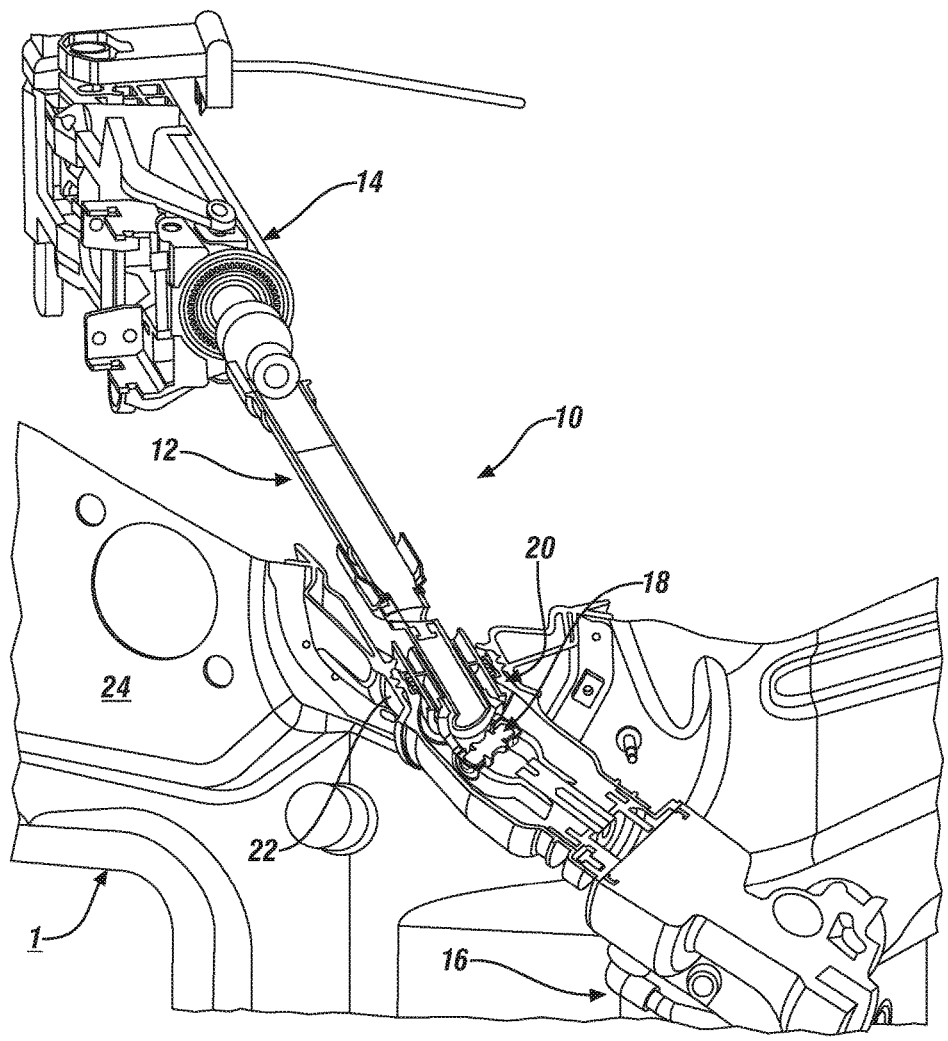
FIG. 1 is a partial sectional view of a steering column assembly, including a bearing assembly, in accordance with an exemplary embodiment.

The following description is merely exemplary in nature and is not intended to limit the present disclosure, its application or uses. It should be understood that throughout the drawings, corresponding reference numerals indicate like or corresponding parts and features.

Figure 2:
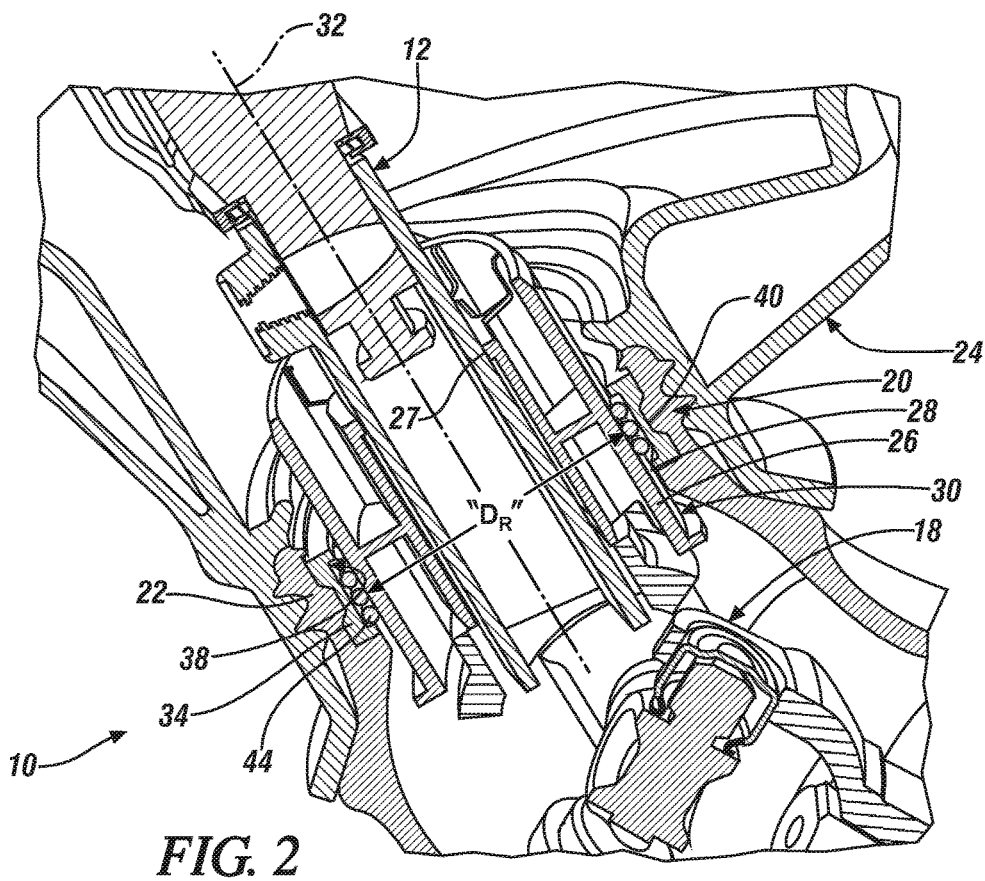
FIG. 2 is an enlarged portion of the steering column assembly illustrated in FIG. 1.

In accordance with an exemplary embodiment, FIG. 1 illustrates a steering column assembly 10 having a rotatable steering shaft 12 that may extend from a steering wheel (not shown) to a steering rack (also not shown). The steering column assembly 10 is, as will be described herein, applicable to be employed with a steering system of an automobile 1. Other steering column assembly configurations and applications are contemplated. The rotatable steering shaft 12 is suspended at an upper end by a support assembly 14 and at its lower end by joint assembly 16. U-joint 18 may be positioned intermediate of the rotatable steering shaft 12 and may be supported by a bearing assembly 20. As shown in FIGS. 1 and 2, the bearing assembly 20 is located within a seal assembly 22 that is mounted to a vehicle bulkhead 24.

The bearing assembly may comprise an inner ring 26 that extends circumferentially around a portion of the steering shaft 12. In an exemplary embodiment, the inner 26 ring comprises an inner circumferential surface 27 that is fixed against rotation about the rotatable shaft 12 via the use of various techniques such as a press fit, a fastener or adhesives, for example. The inner ring 26 has a bearing race 28 (inner bearing race) extending about an outer circumference 30. Spaced radially from the inner ring 26, relative to a steering shaft axis 32, is an outer ring 34. The outer ring 34 is fixed in position relative to a non-rotatable member, such as the vehicle bulkhead 24, by the seal assembly 22 which, in the embodiment shown, extends about an outer circumferential surface 40 of the outer ring 34. The seal assembly 22 may be fixed to the outer surface 40 via a fastener, an interference fit or the use of an adhesive or through other means of attachment. Other configurations are contemplated for positioning the outer ring 34. The outer ring 34 has a bearing race 38 (outer bearing race) extending about an inner circumference 36, FIG. 3, such that the inner bearing race 28 of the inner ring 26 and the outer bearing race 38 are located in radially spaced apart relationship to each other.

Figure 3:
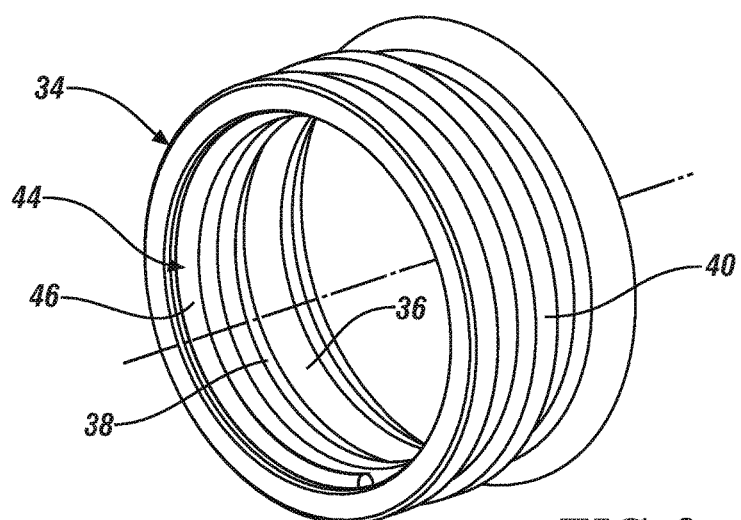
FIG. 3 is a perspective view of a bearing assembly outer race and bearing member, in accordance with an aspect of an exemplary embodiment.
Figure 4:
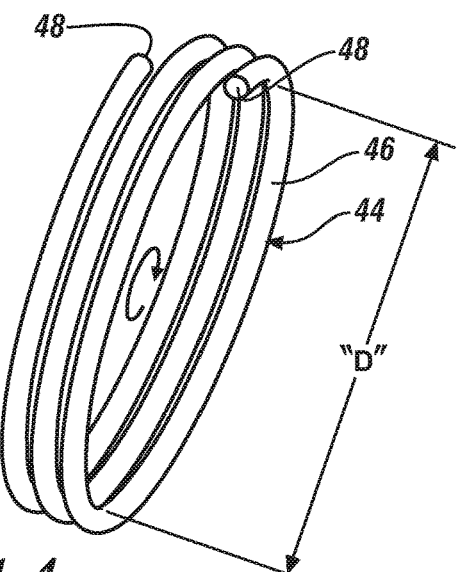
FIG. 4 is a perspective view of the bearing member of FIG. 3.

Referring now to FIGS. 3 and 4, with continuing reference to FIGS. 1 and 2, a bearing member 44 comprises a wire or rod 46 having one of a circular or ovular cross-section that is formed into a wound helix. The use of the terms wire and rod should be viewed as interchangeable and are both used simply as a differentiator of potential size; as the bearing assembly described herein is scalable depending upon application. Going forward, the term "rod" will be used for the remainder of the description. The bearing member 44 has an internal diameter "D" that is the equal to, or smaller than, the diameter "$D_R$" of the inner bearing race 28. In an exemplary embodiment, the bearing member 44 may be placed into the outer bearing race 38 of the outer ring 34, as illustrated in FIG. 3.

Figure 5:
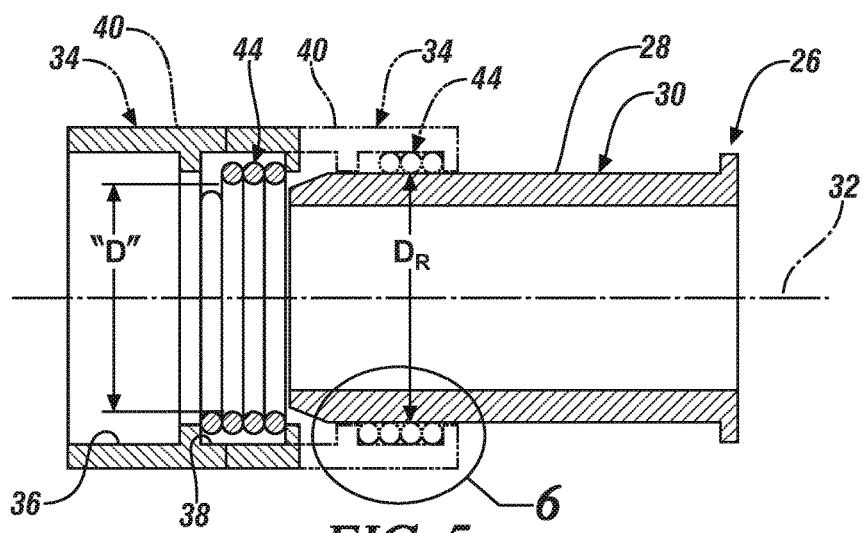
FIG. 5 is a schematic view illustrating the installation of the bearing member, in accordance with an aspect of an exemplary embodiment.

As shown in FIG. 5, in an exemplary embodiment, the outer ring 34, containing the bearing member 44, is installed axially (i.e. slides into position) over the outer circumference 30 of the inner ring 26 until located in the inner bearing race 28. Installation of the bearing member-containing outer ring 34 onto the inner ring 26 causes an expansion of the bearing member 44, in a direction contrary to the direction of the helix winding (i.e. diametrically outwardly). The result is an increase in the bearing inner diameter "D" to the inner bearing race 28 diameter $D_R$. The diametric expansion facilitates installation of the bearing assembly 20 into the steering column assembly 10. Particularly, the outer bearing race 38 containing the expanded diameter bearing member 44 is moved axially over the outer circumference 30 of the inner ring 26 until the bearing member is located in the inner bearing race 28 of the inner ring.

Figure 6:
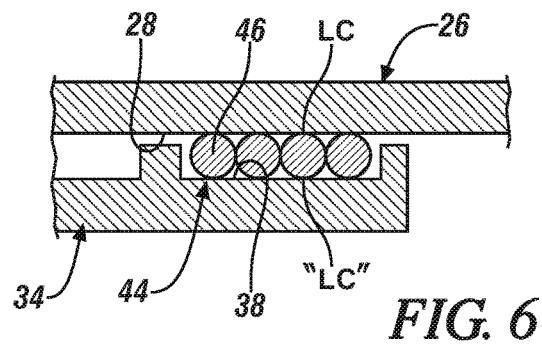
FIG. 6 is an enlarged portion of FIG. 5 taken at Circle 6.

Referring now to FIG. 6, when installed in position between inner bearing race 28 of the inner ring 26 and outer bearing race 38 of outer ring 34, the helical rod 46 defining the bearing member 44 establishes a low friction line contact "LC" with the opposing inner and outer bearing races 28, 38, respectively. The low friction line-contact "LC" between the bearing member 44 and the bearing races 28 and 38 permits low effort rotation of the rotatable steering shaft 12 within the steering column 10. A minimal helix angle "a" is desirable as it improves line contact and reduces friction between the bearing member 44 and the bearing races 28 and 38. In an embodiment, the helix angle α approaches 0 degrees. In addition, the helical configuration of the bearing member 44 defines a labyrinth that impedes both the ingress of contaminants, such a dirt, and moisture into the bearing. The labyrinth also reduces noise generation from the bearing member 44. It is contemplated, in an exemplary embodiment, that the inner ring 26 and the outer ring 34 (i.e. inner bearing race 28 and outer bearing race 38) may be constructed of engineered plastic or polymers like Nylon and Acetal. Other contemplated materials that are common for such assemblies may include hardened steel for instance. The bearing member 44 may be constructed of any material that is suitable for such an application. In an embodiment, the bearing member may also be constructed of engineered plastic or polymers like Nylon and Acetal that exhibits superior wear resistance and, importantly, reduces undesirable sound generation as the rotatable steering shaft 12 rotates relative to the fixed seal assembly 22 and vehicle bulkhead 24.

Figure 7:
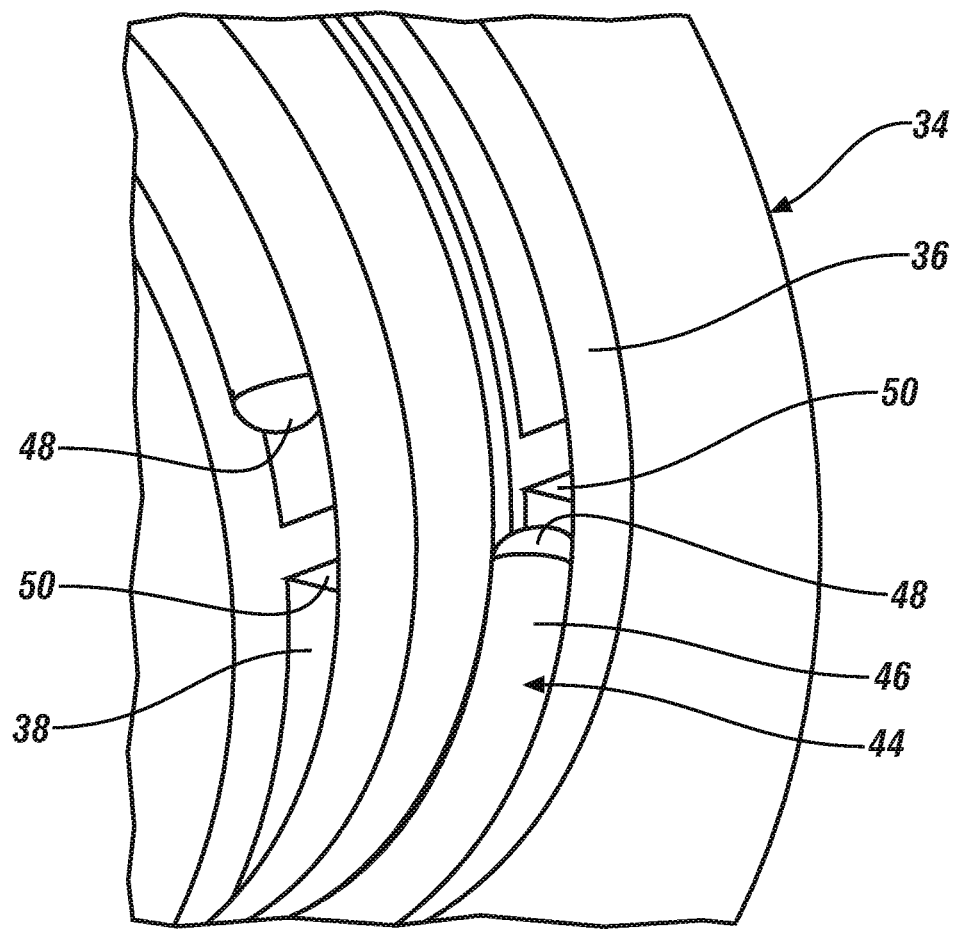
FIG. 7 is an enlarged portion of FIG. 3.

Referring to FIG. 7, in one embodiment, the rod 46 used to form the bearing member 44 has ends 48 that are rounded. The rounding of the ends 48 is useful to prevent gouging or wear on the surfaces of the inner and the outer bearing races 28 and 38 which may otherwise occur due to relative movement of the races with respect to the bearing member during rotation of the rotatable steering shaft 12. One or more bearing stops 50 may be located in outer bearing race 38 to effectively prevent rotation between the bearing member and the outer ring 34.

The disclosure provided herein is directed to a bearing assembly useful in supporting rotatable shafts. While the disclosure has shown the bearing applied to the support of a rotatable steering shaft, it is contemplated that the bearing assembly has application to virtually any rotatable shaft.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A bearing assembly comprising:
    an inner ring having an inner circumferential surface, and
        an outer circumferential surface defining an inner bearing race thereon;

an outer ring having an outer circumferential surface, and an inner circumferential surface having a substantially uniform inner diameter defining in outer bearing race thereon, wherein the inner bearing race of the inner ring and the outer bearing race of the outer ring are located in a radially spaced apart relationship; and a bearing member having a substantially uniform outer diameter comprising a rod, having one of a circular cross-section and an ovular cross-section, formed as a wound helix and disposed between, and in line contact with, the inner bearing race and the outer bearing race to support relative rotation of the inner ring and the outer ring.

2. The bearing assembly of claim 1, wherein the inner circumferential surface of the inner ring is disposed on a rotatable shaft and is fixed against rotation thereabout.

3. The bearing assembly of claim 1, wherein the outer circumferential surface of the outer ring is fixedly disposed relative to a non-rotatable member.

4. The bearing assembly of claim 1, wherein the helix has a helix angle α that approaches 0 degrees.

5. The bearing assembly of claim 1, wherein the rod has rounded ends.

6. The bearing assembly of claim 1, wherein the outer bearing race comprises a bearing stop.

7. A steering column assembly having a rotatable steering shaft extending through a vehicle bulkhead and supported by a bearing assembly, the bearing assembly comprising:
   an inner ring disposed, on the rotatable steering shaft, and having an inner circumferential surface and an outer circumferential surface defining an inner bearing race thereon;
   an outer ring having an outer circumferential surface fixedly disposed relative to the vehicle bulkhead, and an inner circumferential surface defining an outer bearing race thereon, wherein the inner bearing race of the inner ring and the outer bearing race of the outer ring are located in a radially spaced apart relationship; and
   a bearing member comprising a rod, having one of a circular cross-section and an ovular cross-section, formed as a wound helix and disposed between, and in line contact with the inner bearing race and the outer bearing race to support rotation of the rotatable steering shaft relative to the vehicle bulkhead.

8. The steering column assembly of claim 7, wherein the helix has a helix angle α that approaches 0 degrees.

9. The steering column assembly of claim 7, wherein the rod has rounded ends.

10. The steering column assembly of claim 7, wherein the outer bearing race comprises a bearing stop.

11. The steering column assembly of claim 7, wherein the bearing member has a pre-assembled internal diameter "D" that is the equal to, or smaller than, the diameter "$D_R$" of the inner bearing race.

12. A method of installing the bearing member onto the bearing race of claim 11 including:
   placing the bearing member into the outer bearing race of the outer ring;
   expanding the bearing helix in a direction contrary to a direction of winding to increase the bearing inner diameter "D"; and
   axially sliding the outer bearing race containing the expanded diameter bearing member over the outer circumference of the inner ring until the bearing member is located in the inner bearing race of the inner ring.

* * * * *